United States Patent
Subramanian et al.

(10) Patent No.: US 10,552,646 B2
(45) Date of Patent: Feb. 4, 2020

(54) SYSTEM AND METHOD FOR PREVENTING THIN/ZERO CLIENT FROM UNAUTHORIZED PHYSICAL ACCESS

(71) Applicant: AMZETTA TECHNOLOGIES, LLC, Norcross, GA (US)

(72) Inventors: Yugender P. Subramanian, Duluth, GA (US); Varadachari Sudan Ayanam, Suwanee, GA (US); Samvinesh Christopher, Suwanee, GA (US); Rajamanickem Sureshkumar, Chennai (IN)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 85 days.

(21) Appl. No.: 15/224,005

(22) Filed: Jul. 29, 2016

(65) Prior Publication Data
US 2018/0032761 A1   Feb. 1, 2018

(51) Int. Cl.
*G06F 21/86* (2013.01)

(52) U.S. Cl.
CPC ...... *G06F 21/86* (2013.01); *G06F 2221/2143* (2013.01)

(58) Field of Classification Search
CPC .................. G06F 2221/2143; G06F 21/86
See application file for complete search history.

(56) References Cited

U.S. PATENT DOCUMENTS

| 4,980,666 | A  | * | 12/1990 | Hwang    | B60R 25/1003 307/10.2 |
|-----------|----|---|---------|----------|-----------------------|
| 2006/0190984 | A1 | * | 8/2006  | Heard    | H04L 63/102 726/1     |
| 2008/0037791 | A1 | * | 2/2008  | Jakobsson | G06F 21/552 380/278  |
| 2008/0183841 | A1 | * | 7/2008  | Isokawa  | H04L 63/10 709/217    |
| 2012/0056711 | A1 | * | 3/2012  | Hanrahan | G05B 9/02 340/3.4     |
| 2012/0131673 | A1 | * | 5/2012  | Caci     | G06F 21/86 726/23     |
| 2013/0111600 | A1 | * | 5/2013  | Guenther | G06F 21/72 726/26     |
| 2013/0257611 | A1 | * | 10/2013 | Lamb     | G08B 25/008 340/501   |

(Continued)

*Primary Examiner* — Peter C Shaw
(74) *Attorney, Agent, or Firm* — Tim Tingkang Xia, Esq.; Locke Lord LLP (57) ABSTRACT

Certain aspects direct to systems and methods for preventing a thin client or a zero client from unauthorized physical access. A microcontroller is provided and connected to the chassis of the thin client or zero client computing device via a first interface, such as a general-purpose input/output (GPIO) line. Whenever the chassis is physically opened, the chassis generates a signal, and sends the signal to the microcontroller via the GPIO line. Upon receiving the signal, the microcontroller determines that a physical access event occurs to the computing device. Unless the physical access event is authorized, the microcontroller may generate a log to record events for the computing device, and store the log in the storage device; and perform a self-protect action to the computing device. If network connectivity is available, the microcontroller may send the log to a server via the network.

20 Claims, 5 Drawing Sheets

(56) References Cited

U.S. PATENT DOCUMENTS

2016/0189529 A1* 6/2016 Lee ..................... G08B 25/008
  340/541
2016/0358439 A1* 12/2016 Hasan ................... G08B 13/06

* cited by examiner

SYSTEM AND METHOD FOR PREVENTING THIN/ZERO CLIENT FROM UNAUTHORIZED PHYSICAL ACCESS

FIELD

The present disclosure relates generally to thin client or zero client management, and more particularly to systems and methods for preventing and locking a thin client or a zero client from unauthorized physical access to hardware components of the thin client or the zero client.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a network client-server system, a lightweight computer that is purpose-built may be used as a thin client (which contains a full operating system) or a zero client (which uses a lightweight firmware that merely initializes network communication, without the OS) for remotely connecting into a server. Each of the thin clients or zero clients may be positioned in a remote location from the server, and is thus susceptible to tampering and unauthorized physical access of the hardware components. For example, any person may open the chassis or casing of a thin client or zero client and physically access, add or remove hardware components to the thin client or zero client, resulting in security vulnerability of the overall system.

Therefore, an unaddressed need exists in the art to address the aforementioned deficiencies and inadequacies.

SUMMARY

Certain aspects of the present disclosure direct to a system, which includes a computing device functioning as a thin client or a zero client, wherein the computing device comprising a central processing unit (CPU) and a chassis enclosing the CPU; and a microcontroller communicatively connected to the chassis via a first interface, the microcontroller comprises a processor and a storage device storing computer executable code, wherein the computer executable code, when executed at the processor, is configured to: monitor the chassis, wherein the chassis is configured to generate a signal for the first interface when the chassis is physically opened; in response to receiving the signal from the chassis via the first interface, determine that a physical access event occurs to the computing device; and in response to the physical access event, generate a log to record events for the computing device, and store the log in the storage device; and perform a self-protect action to the computing device.

In certain embodiments, the first interface is a general-purpose input/output (GPIO) line.

In certain embodiments, the system further includes a server communicatively connected to the computing device and the microcontroller via a network, wherein the computer executable code, when executed at the processor, is further configured to: in response to the physical access event, send the log to the server via the network.

In certain embodiments, the microcontroller is connected to the CPU of the computing device via a second interface, and the microcontroller is configured to perform the self-protect action to the computing device by: generating a command for the self-protect action; and sending the command to the CPU via the second interface.

In certain embodiments, the second interface is a serial peripheral interface (SPI).

In certain embodiments, the self-protect action includes: disabling or locking features of the computing device; and erasing or changing data stored in the computing device.

In certain embodiments, the storage device of the microcontroller is a non-volatile memory.

In certain embodiments, the system further includes a battery connected to the microcontroller, wherein the microcontroller is powered by a power supply unit (PSU) of the computing device when the PSU is available, and by the battery when the PSU is unavailable.

In certain embodiments, the computer executable code, when executed at the processor, is further configured to: receive an input to authorize access to the computing device for a period of time; and in response to the input, determine, within the period of time, the physical access event as an authorized access event, wherein the computer executable code does not perform the self-protect action to the computing device in response to the authorized event.

In certain embodiments, the system further includes a server communicatively connected to the computing device and the microcontroller via a network, wherein the computer executable code, when executed at the processor, is configured to receive the input to authorize access to the computing device from the server via the network.

Certain aspects of the present disclosure direct to a method for preventing a thin client or a zero client from unauthorized physical access. The method includes: monitoring, by a microcontroller, a chassis of a computing device functioning as the thin client or the zero client of a system, wherein the microcontroller is communicatively connected to the chassis via a first interface, and the chassis is configured to generate a signal for the first interface when the chassis is physically opened; in response to receiving the signal from the chassis via the first interface, determining, by the microcontroller, that a physical access event occurs to the computing device; and in response to the physical access event, generating, by the microcontroller, a log to record events for the computing device, and storing the log in a non-volatile memory; and performing, by the microcontroller, a self-protect action to the computing device.

In certain embodiments, the first interface is a GPIO line.

In certain embodiments, the microcontroller is connected to the CPU of the computing device via a second interface, and the microcontroller is configured to perform the self-protect action to the computing device by: generating a command for the self-protect action; and sending a command to the CPU via the second interface; wherein the second interface is a SPI.

In certain embodiments, the self-protect action includes: disabling or locking features of the computing device; and erasing or changing data stored in the computing device.

In certain embodiments, the method further includes: receiving, by the microcontroller, an input to authorize access to the computing device for a period of time; and in response to the input, determining, nu the microcontroller within the period of time, the physical access event as an authorized access event, wherein the self-protect action to the computing device is not performed in response to the authorized event.

Certain aspects of the present disclosure direct to a non-transitory computer readable medium storing computer executable code. The computer executable code, when executed at a processor of a microcontroller, is configured to: monitor a chassis of a computing device functioning as a thin client or a zero client of a system, wherein the microcontroller is communicatively connected to the chassis via a first interface, and the chassis is configured to generate a signal for the first interface when the chassis is physically opened; in response to receiving the signal from the chassis via the first interface, determine that a physical access event occurs to the computing device; and in response to the physical access event, generate a log to record events for the computing device, and store the log in a non-volatile memory; and perform a self-protect action to the computing device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on BMC simulator. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, thin clients or zero clients may be susceptible to tampering and unauthorized physical access of the hardware components. Generally, the thin clients or zero clients come in different form factors, but each of the thin clients or zero clients should have a chassis or casing. Thus, a management software may be provided to manage the thin clients or zero clients by monitoring the chassis or casing, and detecting and blocking any unauthorized physical access whenever the chassis or casing is opened without authorization.

Figure 1:
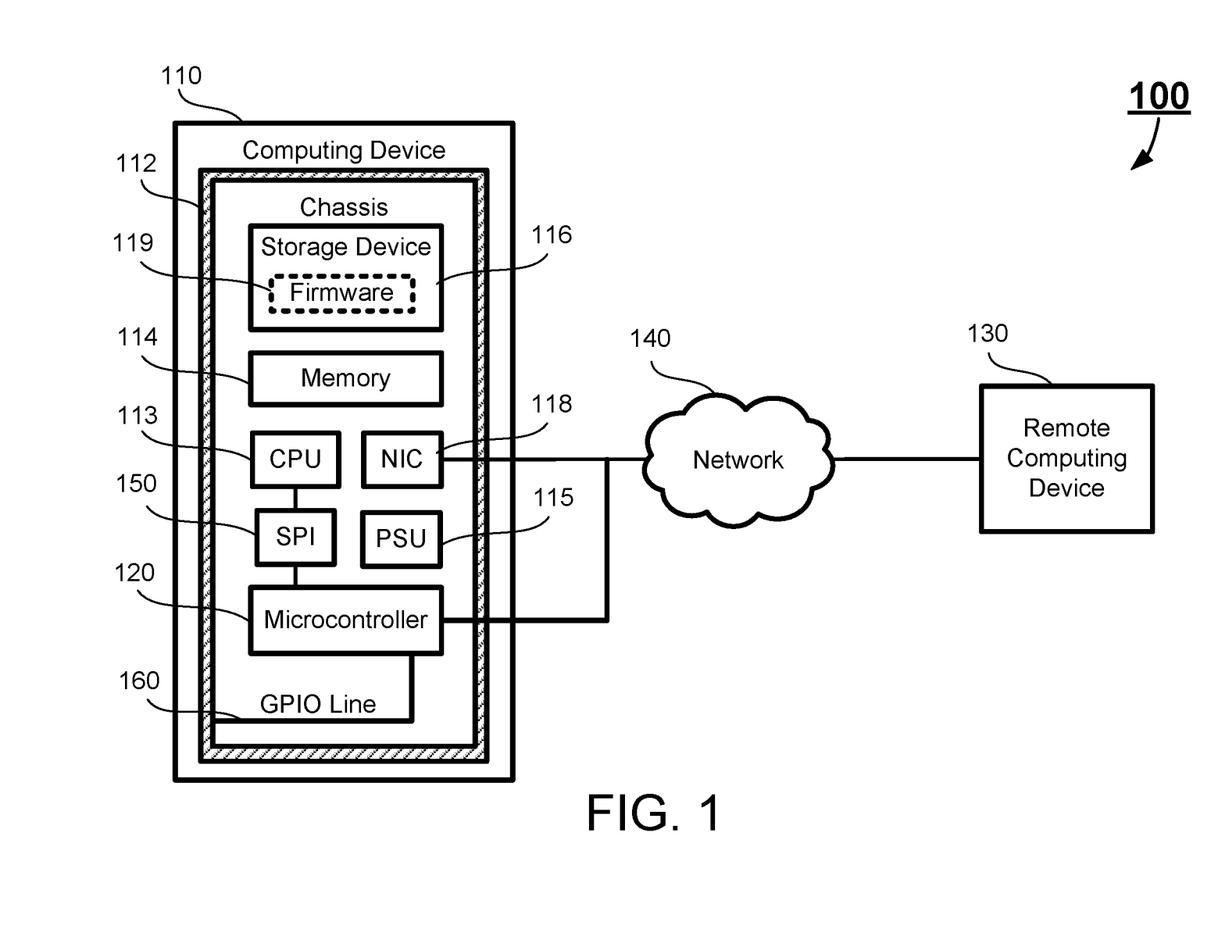
FIG. 1 schematically depicts a system according to certain embodiments of the present disclosure.

FIG. 1 schematically depicts a system according to certain embodiments of the present disclosure. As shown in FIG. 1, the system 100 is a client-server system, which includes a computing device 110 functioning as a thin client or a zero client, and a remote computing device 130 functioning as a server and communicatively connected to the computing device 110 via a network 140. The computing device 110 includes a chassis 112 to enclose other components of the computing device 110, such as a central processing unit (CPU) 113, a memory 114, a power supply unit (PSU) 115, a storage device 116, and a network interface card (NIC) 118. Further, a microcontroller 120 is provided within the chassis 112 of the computing device 110, and is also communicatively connected to the remote computing device 130 (i.e., the server) via the network 140. In certain embodiments, the microcontroller 120 is communicatively connected to the CPU 113 via a serial peripheral interface (SPI) 150, and is connected to the chassis 112 via a general-purpose input/output (GPIO) line 160. In certain embodiments, the network 140 may be a wired or wireless network, and may be of various forms. Examples of the network 140 may include, but is not limited to, a local area network (LAN), a wide area network (WAN) including the Internet, or any other type of networks.

The computing device 110 is a computer functioning as a thin client or a zero client of the system 100. In certain embodiments, the system 100 may include multiple computing devices 110, each functioning as a thin client or a zero client of the system 100.

The chassis 112 of the computing device 110 is a supporting enclosure structure, where the microcontroller 120 and the components of the computing device 110, including the CPU 113, the memory 114, the PSU 115, the storage device 116, the NIC 118 and other components, may be mounted and enclosed therein. In certain embodiments, the chassis 112 may include a frame, a case or other internal physical supporting structure on which the microcontroller 120 and the components of the computing device 110 may be mounted. For example, the chassis 112 may include a metal frame casing. In certain embodiments, when a person attempts to access the components of the computing device 110 (either with or without authorization), the person must open the chassis 112 in order to have the components of the computing device 110 being exposed. As described above, the chassis 112 is connected to the microcontroller 120 via a GPIO line 160, which is an interface between the microcontroller 120 and the chassis 112. In certain embodiments, when the person attempts to open the chassis 112, the chassis 112 may be triggered to generate a signal, which may be sent to the microcontroller 120 via the GPIO line 160.

The CPU 113 is a processor configured to control operation of the computing device 110. The CPU 113 can execute any computer executable code or instructions, such as the firmware 119 of the computing device 110 or other applications and instructions of the computing device 110. In certain embodiments, the computing device 110 may run on more than one CPU, such as two CPUs, four CPUs, or any suitable number of processors. As described above, the CPU 113 is communicatively connected to the microcontroller 120 via a SPI 150, which is an interface between the microcontroller 120 and the CPU 113, such that the microcontroller 120 may send commands to the CPU 113 to perform self-protect actions to the computing device 110.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The PSU 115 is a device to provide power for the computing device 110 and the microcontroller 120. In certain embodiments, the PSU 115 converts main AC power to low-voltage regulated DC power for the components of the computing device 110 and the microcontroller 120.

The storage device 116 is a non-volatile data storage media for storing the applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the firmware 119 and other applications of the computing device 110 may be stored in one or more of the storage devices 116 of the computing device 110. The firmware 119 stored in the storage device 116 may include computer executable code or instructions executable at the CPU 113 to control the basic operation of the computing device 110 as the thin client or the zero client. In certain embodiments, the computer executable code or instructions may include a plurality of modules to collectively form the firmware 119. In certain embodiments, the storage device 116 may store other applications independent from the firmware 119.

The NIC 118 is a network interface, which functions as a point of interconnection for the computing device 110 with the remote computing device 130 or any other device through the network 140. In certain embodiments, the NIC 118 may be implemented by hardware and/or software components, and does not necessarily have a physical form. In certain embodiments, the computing device 110 may include more than one NIC 118 to be connectable to multiple different networks.

Figure 2:
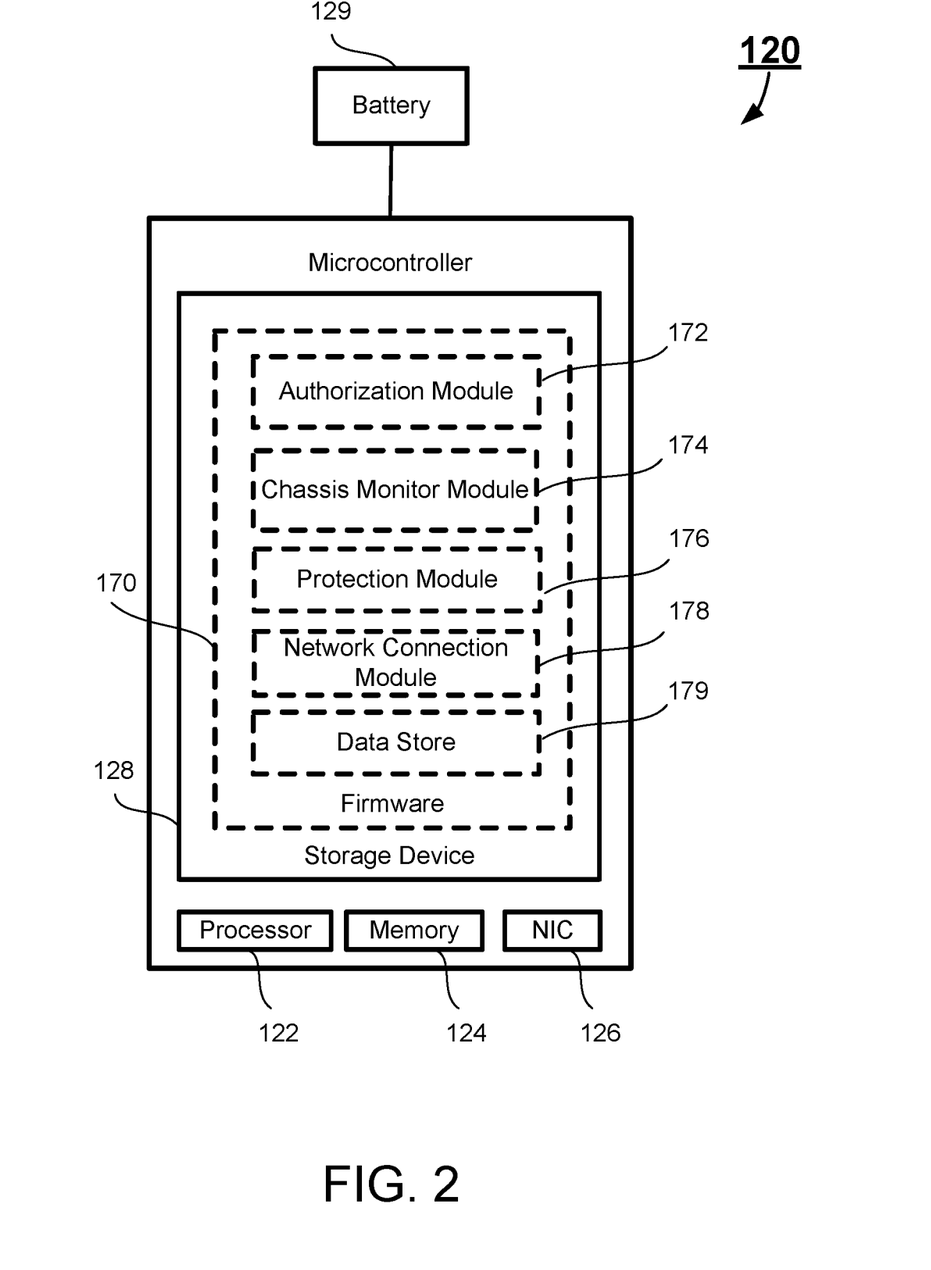
FIG. 2 schematically depicts a microcontroller of the system according to certain embodiments of the present disclosure.

The microcontroller 120 is an out-of-band (OOB) controller chip which may run independently and separately from the computing device 110 for monitoring any physical access, particularly the unauthorized physical access, to the computing device 110. FIG. 2 schematically depicts a microcontroller of the system according to certain embodiments of the present disclosure. As shown in FIG. 2, the microcontroller 120 includes a processor 122, a memory 124, a NIC 126, and a storage device 128. Further, a battery 129 may be provided to the microcontroller 120 to provide power for the microcontroller 120 when the power from the PSU 115 of the computing device 110 becomes unavailable. In certain embodiments, the microcontroller 120 may include other hardware components and software components (not shown) to perform its corresponding tasks. Examples of these hardware and software components may include, but not limited to, other required memory, interfaces, buses, Input/Output (I/O) modules and peripheral devices.

The processor 122 is configured to control operation of the microcontroller 120. In certain embodiments, the processor 122 can execute any computer executable code or instructions, such as the firmware 170 of the microcontroller 120. In certain embodiments, the microcontroller 120 may run on more than one processor, such as two processors or any suitable number of processors.

The memory 124 can be a volatile memory, such as the random-access memory (RAM), for storing the data and information during the operation of the microcontroller 120. In certain embodiments, the memory 124 may be a volatile memory array. In certain embodiments, the microcontroller 120 may run on more than one memory 124.

The NIC 126 is a network interface, which functions as a point of interconnection for the microcontroller 120 with the remote computing device 130 or any other device through the network 140, such that the microcontroller 120 may be in communication with the remote computing device 130 if needed. In certain embodiments, the NIC 126 may be implemented by hardware and/or software components, and does not necessarily have a physical form. In certain embodiments, the microcontroller 120 may include more than one NIC 126 to be connectable to multiple different networks.

The battery 129 is provided to supply power for the microcontroller 120, particularly when the power from the PSU 115 of the computing device 110 is unavailable. In certain embodiments, when an unauthorized access event occurs to the computing device 110, the first thing the person may do to the computing device 110 is disconnecting the power of the computing device 110. Thus, the battery 129 may ensure that the microcontroller 120 maintains functional when such unauthorized access event occurs.

The storage device 128 is a non-volatile data storage media for storing the applications of the microcontroller 120. Examples of the storage device 128 may include non-volatile memory such as flash memory, memory cards, USB drives, or any other types of data storage devices. In certain embodiments, the microcontroller 120 may have multiple storage devices 128, which may be identical storage devices or different types of storage devices, and the firmware 170 of the microcontroller 120 may be stored in one or more of the storage devices 128 of the microcontroller 120. In certain embodiments, the storage device 128 may store other applications independent from the firmware 170.

The firmware 170 stored in the storage device 128 may include computer executable code or instructions executable at the processor 122, and the computer executable code or instructions may include a plurality of modules to collectively form the firmware 170. As shown in FIG. 2, the modules of the firmware 170 may include, without being limited to: an authorization module 172, a chassis monitor module 174, a protection module 176, a network connection module 178, and a data store 169. In certain embodiments, each of the modules of the firmware 170 may further include sub-modules. Alternatively, in certain embodiments, some or all of the modules of the firmware 170 may be combined to form a single module.

The authorization module 172 is a module for authorizing the physical access to the computing device 110. In certain embodiments, all physical access to the computing device 110 may be set to be unauthorized as the default value. To authorize the physical access, an administrator of the system 100 may send an input from the remote computing device 130 (i.e., the server of the system 100) to authorize access to the computing device 110 for a predetermined period of time, such as 30 minutes. In certain embodiments, once the microcontroller 120 receives such input, the authorization module 172 may determine that any physical access event occurred within the predetermined period of time (e.g., 30 minutes) to the computing device 110 is an authorized access event, and the other modules of the firmware 170 will not do anything in response to the authorized access event. In certain embodiments, when the microcontroller 120 receives such input, the authorization module 172 may suspend some or all of the other modules of the firmware 170 for the predetermined period of time (e.g., 30 minutes), and the authorization module 172 may be the only active module of the firmware 170 during the period of time.

The chassis monitor module 174 is a module for monitoring the chassis 112. In certain embodiments, when the chassis 112 is opened, the chassis may generate a signal and send the signal to the microcontroller 120 via the GPIO line 160, which is an interface between the microcontroller 120 and the chassis 112. Upon receiving the signal from the chassis 112 via the GPIO line 160, the chassis monitor module 174 may determine that a physical access event occurs to the computing device 110. It should be noted that the chassis monitor module 174 does not perform determination as to whether the physical access event is authorized or not.

The protection module 176 is a module for performing log and self-protect actions for the computing device 110. In certain embodiments, when the chassis monitor module 174 determines that an physical access event occurs, and the authorization module 172 does not indicate that the physical access event is authorized, the protection module 176 may start performing the log and self-protect actions to the computing device 110. In certain embodiments, the log process may include generating a log to record events for the computing device 110, and storing the log in the data store 179 of the storage device 128. In certain embodiments, the self-protect action may involve disabling or locking features of the computing device 110, and/or erasing or changing data stored in the computing device 110. When the protection module 176 performs the self-protect action, the protection module 176 may generate a command for the self-protect action, and then send the command to the CPU via the SPI 150.

The network connection module 178 is a module for controlling network communication through the NIC 126. In certain embodiments, when the remote computing device 130 (i.e., the server of the system 100) sends the input to the microcontroller 120, the network connection module 178 may control the NIC 126 to receive the input. In certain embodiments, when the microcontroller 120 attempts to send information, such as the log or any other information of the computing device 110, to the remote computing device 130 (i.e., the server of the system 100) via the network 140, the network connection module 178 may control the NIC 126 to send out the information to the remote computing device 130 via the network 140.

The data store 179 is a database which stores information of the microcontroller 120. In certain embodiments, the information stored in the data store 179 may include the log for to recording the events for the computing device 110, and other information relating the self-protect actions to the computing device 110.

The remote computing device 130 is a computing device functioning as a server of the system 100. In certain embodiments, the remote computing device 130 may be a VM server for providing virtual machine services, such that the computing device 110 (i.e., the thin client/zero client) may access the virtual machine provided by the VM server. In certain embodiments, the remote computing device 130 may be general purpose computer, a specialized computer, or any other types of computing device. In certain embodiments, the system 100 may include multiple remote computing devices 130 to provide server functionalities. In certain embodiments, an administrator of the system 100, may operate the remote computing device 130 to communicate with the microcontroller 120 in order to remotely authorize the physical access to the computing device 110.

Figure 3:
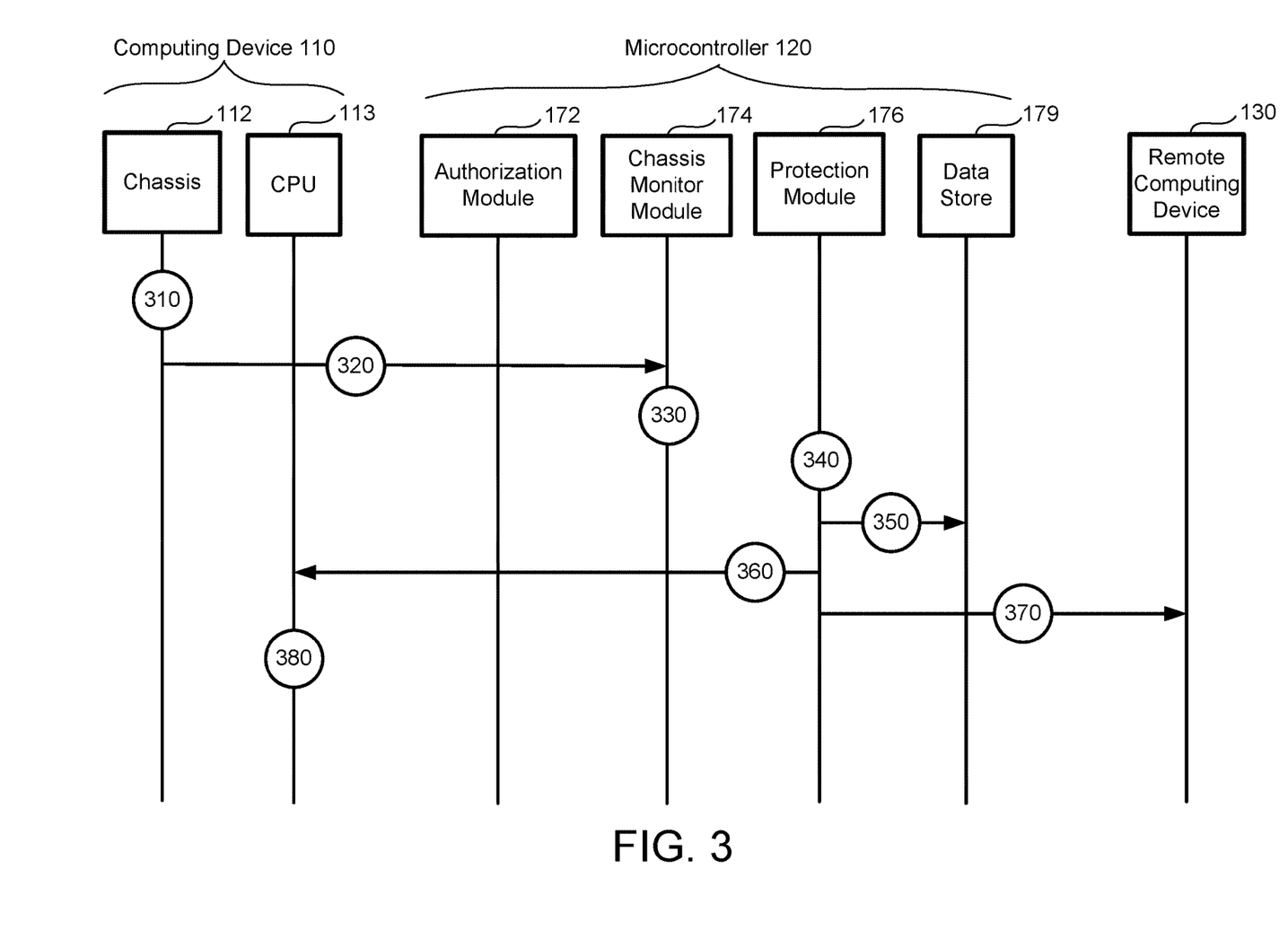
FIG. 3 depicts a flowchart showing a self-protect process of the computing device by the microcontroller in response to an unauthorized access event according to certain embodiments of the present disclosure.

FIG. 3 depicts a flowchart showing a self-protect process of the computing device by the microcontroller in response to an unauthorized access event according to certain embodiments of the present disclosure. In certain embodiments, the method as shown in FIG. 3 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 3.

As shown in FIG. 3, at procedure 310, when a person attempts to open the chassis 112 of the computing device 110, the chassis 112 generates a corresponding signal. At procedure 320, the chassis 112 sends the signal to the microcontroller 120 via the GPIO line 160. At the microcontroller 120, upon receiving the signal, at procedure 330, the chassis monitor module 174 determines that a physical access event occurs to the computing device 110. Since there is no input to authorize the access event prior to the event occurs, the access event is an unauthorized access event.

At procedure 340, the protection module 176, in response to the unauthorized access event, starts the self-protect actions by generating a command for the self-protect action, which is to be sent to the CPU 113 of the computing device 110. At procedure 350, the protection module 176 starts generating a log to record events for the computing device 110, and storing the log in the data store 179. Then, at procedure 360, the protection module 176 sends the command to the CPU 113 of the computing device 110 to perform the self-protect action. Optionally, at procedure 370, the protection module 176 may attempt to send the log to the remote computing device 130 (i.e., the server) via the network 140, if the network connection is still available. At the computing device 110, at procedure 380, the CPU 113 may perform the self-protect action based on the command received. In certain embodiments, the self-protect action may include: disabling or locking features of the computing device 110; and/or erasing or changing data stored in the computing device 110.

Figure 4:
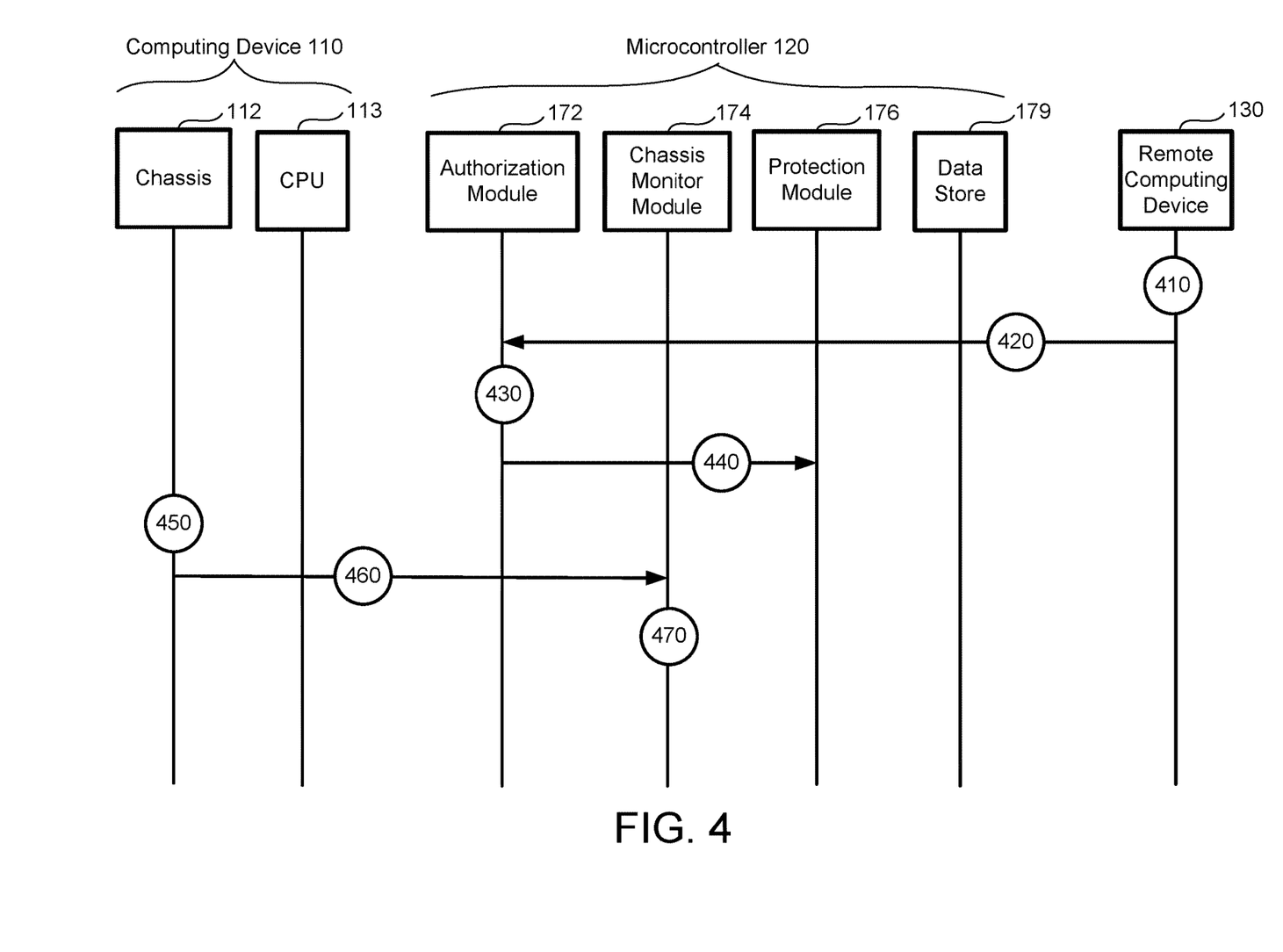
FIG. 4 depicts a flowchart showing a process by the microcontroller in response to an authorized access event according to certain embodiments of the present disclosure.

FIG. 4 depicts a flowchart showing a process by the microcontroller in response to an authorized access event according to certain embodiments of the present disclosure. In certain embodiments, the method as shown in FIG. 4 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 4.

As shown in FIG. 4, at procedure 410, at the remote computing device 130, an administrator may generate an input to authorize the physical access to the computing device 110 for a certain period of time (e.g., 30 minutes). It should be noted that the administrator may not necessarily have local access to the remote computing device 130. For example, the administrator may remotely connect to the remote computing device 130 through another thin client computing device to generate the input. At procedure 420, the input may be sent from the remote computing device 130 to the microcontroller 120 via the network 140.

At the microcontroller 120, upon receiving the input, at procedure 430, the authorization module 172 may determine that any physical access event within the period of time (e.g., 30 minutes) will be an authorized access event. In certain embodiments, at procedure 440, the authorization module 172 may suspend the protection module 176 for the period of time (30 minutes).

At procedure 450, when a person attempts to open the chassis 112 of the computing device 110 during the period of time, the chassis 112 generates a corresponding signal. At procedure 460, the chassis 112 sends the signal to the microcontroller 120 via the GPIO line 160. At the microcontroller 120, upon receiving the signal, at procedure 470, the chassis monitor module 174 determines that a physical access event occurs to the computing device 110. Since there is a prior input to authorize the access event, the access event is an authorized access event, and no further self-protect action is performed.

Figure 5:
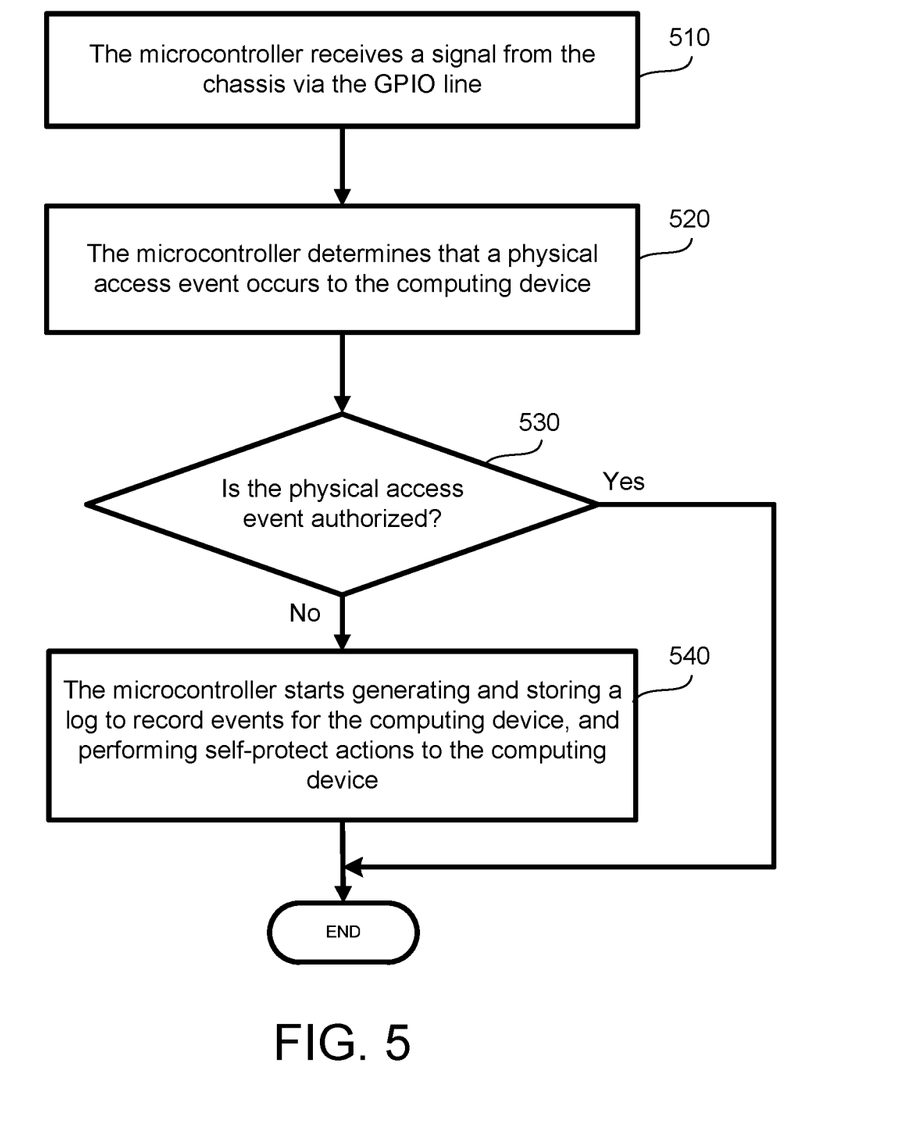
FIG. 5 depicts a flowchart showing a method for preventing and locking a thin client or a zero client from unauthorized physical access according to certain embodiments of the present disclosure.

A further aspect of the present disclosure is directed to a method for preventing a thin client or a zero client from unauthorized physical access by a microcontroller. FIG. 5 depicts a flowchart showing a method for preventing and locking a thin client or a zero client from unauthorized physical access according to certain embodiments of the present disclosure. In certain embodiments, the method as shown in FIG. 5 may be implemented on a system as shown in FIGS. 1 and 2, particularly the microcontroller 120. It should be particularly noted that, unless otherwise stated in the present disclosure, the steps of the method may be arranged in a different sequential order, and are thus not limited to the sequential order as shown in FIG. 5.

At procedure 510, the microcontroller 120 receives a signal from the chassis 112 of the computing device 110 (i.e., a thin client or a zero client) via the GPIO line 160. In certain embodiments, the signal is generated by the chassis 112 when the chassis 112 is opened. At procedure 520, in response to the signal, the microcontroller 120 determines that a physical access event occurs to the computing device 110. At procedure 530, the microcontroller 120 determines whether the physical access event is authorized or not. If the event is authorized, the microcontroller 120 does nothing. If the event is unauthorized, at procedure 540, the microcontroller starts generating and storing a log to record events for the computing device 110, and performing self-protect actions to the computing device 120.

In a further aspect, the present disclosure is related to a non-transitory computer readable medium storing computer executable code. The computer executable code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 128 of the microcontroller 120 as shown in FIG. 2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a computing device as a thin client or a zero client, wherein the computing device comprises a central processing unit (CPU) and a chassis enclosing the CPU, and the computing device as the thin client or the zero client is remotely accessible by a server; and
   a microcontroller located and operated entirely within the chassis of the computing device and operated independently and separately from the computing device, and communicatively connected to the chassis via a first interface, the microcontroller comprises a processor and a storage device storing computer executable code, wherein the computer executable code, when executed at the processor, is configured to:
      monitor the chassis, wherein the chassis is configured to generate a signal for the first interface when the chassis is physically opened;
      in response to receiving the signal from the chassis via the first interface, determine that a physical access event occurs to the computing device; and
      in response to the physical access event,
         generate a log to record events for the computing device, and store the log in the storage device; and
         perform a self-protect action to the computing device.

2. The system as claimed in claim 1, wherein the first interface is a general-purpose input/output (GPIO) line.

3. The system as claimed in claim 1, further comprising a server communicatively connected to the computing device and the microcontroller via a network, wherein the computer executable code, when executed at the processor, is further configured to:
   in response to the physical access event, send the log to the server via the network.

4. The system as claimed in claim 1, wherein the microcontroller is connected to the CPU of the computing device via a second interface, and the microcontroller is configured to perform the self-protect action to the computing device by:
   generating a command for the self-protect action; and
   sending the command to the CPU via the second interface.

5. The system as claimed in claim 4, wherein the second interface is a serial peripheral interface (SPI).

6. The system as claimed in claim 1, wherein the self-protect action comprises:
   disabling or locking features of the computing device; and
   erasing or changing data stored in the computing device.

7. The system as claimed in claim 1, wherein the storage device of the microcontroller is a non-volatile memory.

8. The system as claimed in claim 1, further comprising a battery connected to the microcontroller, wherein the microcontroller is powered by a power supply unit (PSU) of the computing device when the PSU is available, and by the battery when the PSU is unavailable.

9. The system as claimed in claim 1, wherein the computer executable code, when executed at the processor, is further configured to:
   receive an input to authorize access to the computing device for a period of time; and
   in response to the input, determine, within the period of time, the physical access event as an authorized access event, wherein the computer executable code does not perform the self-protect action to the computing device in response to the authorized access event.

10. The system as claimed in claim 9, further comprising a server communicatively connected to the computing device and the microcontroller via a network, wherein the computer executable code, when executed at the processor, is configured to receive the input to authorize access to the computing device from the server via the network.

11. A method for preventing a thin client or a zero client from unauthorized physical access, the method comprising:
   monitoring, by a microcontroller, a chassis of a computing device as the thin client or the zero client of a system, wherein the microcontroller is located and operated entirely within the chassis of the computing device and operated independently and separately from the computing device, and is communicatively connected to the chassis via a first interface, the computing device as the thin client or the zero client is remotely accessible by a server, and the chassis is configured to generate a signal for the first interface when the chassis is physically opened;
   in response to receiving the signal from the chassis via the first interface, determining, by the microcontroller, that a physical access event occurs to the computing device; and
   in response to the physical access event,
      generating, by the microcontroller, a log to record events for the computing device, and storing the log in a non-volatile memory; and
      performing, by the microcontroller, a self-protect action to the computing device.

12. The method as claimed in claim 11, wherein the first interface is a general-purpose input/output (GPIO) line.

13. The method as claimed in claim 11, wherein the microcontroller is connected to the CPU of the computing device via a second interface, and the microcontroller is configured to perform the self-protect action to the computing device by:
   generating a command for the self-protect action; and
   sending a command to the CPU via the second interface;
   wherein the second interface is a serial peripheral interface (SPI).

14. The method as claimed in claim 11, wherein the self-protect action comprises:
   disabling or locking features of the computing device; and
   erasing or changing data stored in the computing device.

15. The method as claimed in claim 11, further comprising:
   receiving, by the microcontroller, an input to authorize access to the computing device for a period of time; and
   in response to the input, determining, nu the microcontroller within the period of time, the physical access event as an authorized access event, wherein the self-protect action to the computing device is not performed in response to the authorized event.

16. A non-transitory computer readable medium storing computer executable code, wherein the computer executable code, when executed at a processor of a microcontroller, is configured to:
   monitor a chassis of a computing device as a thin client or a zero client of a system, wherein the microcontroller is located and operated entirely within the chassis of the computing device and operated independently and separately from the computing device, and is communicatively connected to the chassis via a first interface, the computing device as the thin client or the zero client is remotely accessible by a server, and the chassis is configured to generate a signal for the first interface when the chassis is physically opened;
   in response to receiving the signal from the chassis via the first interface, determine that a physical access event occurs to the computing device; and
   in response to the physical access event,
      generate a log to record events for the computing device, and store the log in a non-volatile memory; and
      perform a self-protect action to the computing device.

17. The non-transitory computer readable medium as claimed in claim 16, wherein the first interface is a general-purpose input/output (GPIO) line.

18. The non-transitory computer readable medium as claimed in claim 16, wherein the microcontroller is connected to the CPU of the computing device via a second interface, and the microcontroller is configured to perform the self-protect action to the computing device by:
   generating a command for the self-protect action; and
   sending a command to the CPU via the second interface.

19. The non-transitory computer readable medium as claimed in claim 16, wherein the self-protect action comprises:
   disabling or locking features of the computing device; and
   erasing or changing data stored in the computing device.

20. The non-transitory computer readable medium as claimed in claim 16, wherein the computer executable code, when executed at the processor, is further configured to:
   receive an input to authorize access to the computing device for a period of time; and
   in response to the input, determine, within the period of time, the physical access event as an authorized access event, wherein the computer executable code does not perform the self-protect action to the computing device in response to the authorized event.

* * * * *